United States Patent [19]
Beaulieu

[11] Patent Number: 4,879,818
[45] Date of Patent: Nov. 14, 1989

[54] CLAPBOARD SLIDE GAUGE

[76] Inventor: Nicholas J. Beaulieu, 2 Spruce St., Gardiner, Me. 04345

[21] Appl. No.: 301,891

[22] Filed: Jan. 26, 1989

[51] Int. Cl.4 .............................................. G01B 3/30
[52] U.S. Cl. ...................................................... 33/646
[58] Field of Search ................. 33/646, 647, 648, 649, 33/411

[56] References Cited
U.S. PATENT DOCUMENTS
742,571 10/1903 Blohm .................................... 33/646
995,574 6/1911 Sarlls ...................................... 33/640

FOREIGN PATENT DOCUMENTS
6171 4/1918 United Kingdom .................. 33/646

Primary Examiner—Harry N. Haroian
Attorney, Agent, or Firm—William Nitkin

[57] ABSTRACT

A clapboard slide gauge having a wedge-shaped body member with a clapboard receipt notch defined in its base, such notch to receive a lower clapboard to be slid under an adjacent upper clapboard when the pointed portion of the clapboard slide gauge is pushed thereunder, said lower clapboard in the receipt notch to be slid upwards a desired distance as indicated on a scale on the body of the gauge where the lower clapboard is to be retained in place while the clapboard slide gauge is withdrawn from between the upper and lower clapboards.

1 Claim, 1 Drawing Sheet

CLAPBOARD SLIDE GAUGE

BACKGROUND OF THE INVENTION

1. Field of the Invention

The device of this invention resides in the area of tools and more particularly relates to a clapboard slide gauge which positions clapboards a desired distance under the clapboard immediately thereabove.

2. Description of the Prior Art

Clapboards are a well known siding material installed on frame buildings. The bottom of each clapboard overlaps the top of the next lower clapboard to create a waterproof side for the structure. In present day installations, each succeeding lower clapboard is slid upwards under the next adjacent upper clapboard a distance until it protrudes below the upper clapboard a desired number of inches wherein it is nailed in position. This number of inches of clapboard protrusion can differ from installation to installation depending upon the wishes of the builder, but it is commonly a 3–4 inch exposure of the lower clapboard.

Many years ago clapboards were installed from the bottom up with each clapboard being installed overlapping the next adjacent lower clapboard at a position to leave the lower clapboard exposed a desired number of inches. Devices to position clapboards at the set distances above the next adjacent lower clapboard were developed. These devices are historic in nature and are not utilized today in the trade as they were developed, in many cases, more than a century ago. Examples of such devices may be seen in U.S. Pat. No. 33,199 to Enman dated 9/3/1861 which illustrates a device which can be preset to a distance for the positioning of an upper clapboard over a lower clapboard. Another similar type of gauge is seen in U.S. Pat. No. 389,501 to Cutler patented on 09/11/1888 which also shows a device for holding clapboards in position over lower clapboards for the upper clapboards to be nailed in place. This device also provides an adjustable support for the upper clapboard to position it at a desired distance above the next lower clapboard. A similar device is seen in U.S. Pat. No. 774,114 to Spear patented 11/01/04 which also discloses a device with an adjustable gauge member for positioning the upper clapboard to be nailed in position a preset distance over the lower clapboard.

SUMMARY OF THE INVENTION

It is an object of this invention to provide a clapboard slide gauge which can be used in accordance with today's methods of construction to allow the proper positioning of the next lower clapboard which is inserted and slid under the already tacked in position upper clapboard to a point of desired protrusion from under the upper clapboard.

It is a further object of this invention to provide means for quickly and easily positioning each new clapboard under the next above clapboard without the need for separate measuring means to determine the distance of extension of each lower clapboard from under each upper clapboard before it is nailed in place.

The device of this invention has a solid body with a base having a clapboard receipt notch defined therein. At the bottom of the clapboard receipt notch is a ledge on which the clapboard to be installed is rested. The clapboard to be installed within the clapboard receipt notch is then located within the body of the device of this invention so that the rear face of the clapboard is in line with the base of the device of this invention. The top of the device of this invention extends rearwardly at an angle to form a wedge wherein the tip of the wedge can be inserted under the upper clapboard and the device moved upwards carrying with it the clapboard to be installed under the upper clapboard as the tip of the device slides under the upper clapboard and wedges the upper clapboard away from the wall, carrying within the device the lower clapboard to its position where it is to be nailed. The upper portion of the clapboard receipt notch is formed with an arc so that once the clapboard being installed is in proper position as determined by alignment of the bottom of the upper clapboard to a measurement on a scale on the outer face of the device of the invention, the device is then pulled downward and the lower clapboard is held in position with the device of the invention sliding over the lower clapboard's upper exterior edge along the arc of the upper portion of the clapboard receipt notch allowing the device to be withdrawn after initial nailing of the lower clapboard.

DESCRIPTION OF THE PREFERRED EMBODIMENT(S)

Figure 1:
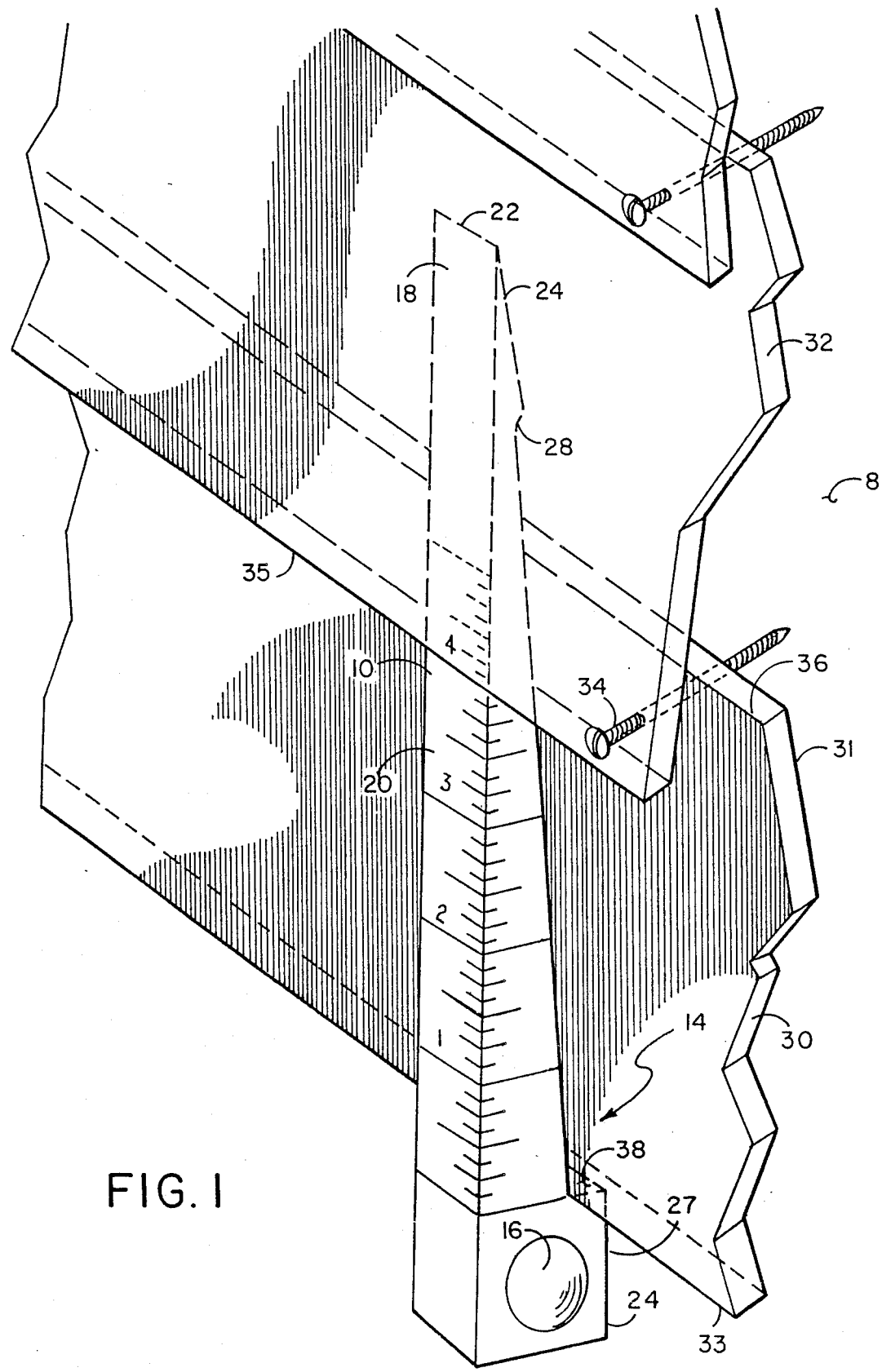
FIG. 1 illustrates a perspective view of the clapboard slide gauge of this invention adjacent to the structure on which clapboards are being installed showing a clapboard to be installed in place within the clapboard receipt notch of the clapboard slide gauge which clapboard is being inserted under an upper clapboard.

FIG. 1 illustrates a perspective view of the clapboard slide gauge of this invention adjacent to wall 8 of a building to which clapboards are being installed. In this view upper clapboard 32 is already loosely tacked in position by a nail and clapboard slide gauge 10 is being utilized to install lower clapboard 30. Clapboard receipt notch 14 is provided within base 24 of clapboard slide gauge 10 having notch base 38 at its bottom, notch base 38 being perpendicular to the wall of the building and forming a ledge to support lower clapboard 30. Clapboard receipt notch 14 is of a size that clapboard 30 will fit completely therein with clapboard bottom 33 a line with base 24 of clapboard slide gauge 10. Angular top 18 of the device extends from tip 22 at a sharp angle rearwards forming a narrow pointed tip at the top of clapboard slide gauge 10, such top 18 extending downward to the end of the body approximately $8\frac{3}{4}$ inches from the tip. Clapboard slide gauge 10 is approximately 1 3/16 inches in depth at its bottom. At the upper portion of clapboard receipt notch 14 is clapboard slide arc 28 which is formed at an arc angle so that when lower clapboard 30 is placed in position within the clapboard receipt notch and tip 22 is slid under upper clapboard 32 and clapboard slide gauge 10 is moved upwards until the bottom of the upper clapboard 32 is aligned with the desired measurement on top scale 20, the lower clapboard can be tacked in place and clapboard slide gauge 10 withdrawn with clapboard slide arc 28 slipping over top front edge 36 of lower clapboard 30 as clapboard slide gauge 10 is pulled out from between upper clapboard 32 and lower clapboard 30. Scale 20 is imprinted on the upper portion of clapboard slide gauge 10 and this scale can also be imprinted on the sides. Scale 20 starts at its zero point from a point corresponding to the top of the device and descends to the bottom of notch base 38 so that when clapboard slide gauge 10 is inserted under the upper clapboard as the example shown and moved to the 4-inch mark wherein the base of upper clapboard 32 is aligned with the 4-inch designation, base 33 of lower clapboard 30 is positioned 4 inches below bottom 35 of upper clapboard 32. Different distances of positioning the base of the lower clapboard from the base of the upper clapboard can be used. For example the base of the lower clapboard can extend 5 inches below the base of the upper clapboard if the device were moved to the 5-inch mark on the scale or 3 inches if clapboard slide gauge 10 were moved to the 3-inch mark. Indentations in the side of clapboard slide gauge 10 forming finger grips 16 can be used to help slide clapboard slide gauge 10 out from between the clapboards once they have been properly positioned. Nails such as nail 34 can pass through the clapboards and be hammered approximately 8-12 inches on one side so that one can slide the device to the next desired location and pull it out when one has the clapboard lightly, but not too tightly, nailed so as to allow removal of clapboard slide gauge 10. Once several rows of clapboards are in position, the nails can be set tightly. Lower portion 27 of base 24 below notch base 38 is cut away at a slight upwards angle from a line with the wall so as not to catch the wall when pulled downward. This design allows for easy sliding downward of clapboard slide gauge 10 when one is ready to remove it after having positioned the lower clapboard under the upper clapboard for installation.

The top of clapboard slide gauge 10 shows the scale imprinted thereon aligned with notch base 38 with the scale extending thereabove which can be easily read and aligned for usage. The shape of clapboard slide gauge 10 of this invention, being a very narrow wedge shape coming to a pointed tip, allows it to be easily inserted under upper clapboard 32 without lifting the upper clapboard too much away from the wall of the building and also allows for easy withdrawal of clapboard slide gauge 10 by sliding it over the lower clapboard at its clapboard slide arc 28. After removal of clapboard slide gauge 10, the clapboards can be firmly fastened, as the nails have only been initially tacked in position, by setting the nails for the final tight installation.

Although the present invention has been described with reference to particular embodiments, it will be apparent to those skilled in the art that variations and modifications can be substituted therefor without departing from the principles and spirit of the invention.

I claim:

1. A device for installation of a lower clapboard under the next adjacent upper clapboard, comprising:
 a body member having a base, an upper tip portion and a top extending at an angle to said base forming a wedge shape for insertion under said upper clapboard;
 a clapboard receipt notch having an upper and lower portion defined in said base adapted to receive a clapboard, said clapboard receipt notch having a notch base at its lower portion;
 a measurement scale on said device with its 0 point aligned with said notch base; and
 a clapboard slide arc defined in the upper portion of said clapboard receipt notch to allow easy removal of said device when said lower clapboard is tacked in place by the clapboard slide arc sliding over the top front edge of said lower clapboard being installed when the device is withdrawn after positioning said lower clapboard under said upper clapboard a distance corresponding to a desired measurement on said scale aligned with the base of said upper clapboard.

* * * * *